(12) United States Patent
Kim et al.

(10) Patent No.: US 11,600,879 B2
(45) Date of Patent: Mar. 7, 2023

(54) BATTERY MODULE

(71) Applicant: SK INNOVATION CO., LTD., Seoul (KR)

(72) Inventors: Young Ki Kim, Daejeon (KR); Ju Yong Park, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 16/677,220

(22) Filed: Nov. 7, 2019

(65) Prior Publication Data

US 2020/0144567 A1 May 7, 2020

(30) Foreign Application Priority Data

Nov. 7, 2018 (KR) .................. 10-2018-0135949

(51) Int. Cl.
| | |
|---|---|
| *H01M 50/262* | (2021.01) |
| *H01M 50/209* | (2021.01) |
| *H01M 50/507* | (2021.01) |
| *H01M 50/516* | (2021.01) |
| *H01M 50/543* | (2021.01) |
| *H01M 50/20* | (2021.01) |
| *H01M 50/502* | (2021.01) |
| *H01M 50/531* | (2021.01) |

(52) U.S. Cl.
CPC ......... *H01M 50/20* (2021.01); *H01M 50/502* (2021.01); *H01M 50/531* (2021.01)

(58) Field of Classification Search
CPC .. H01M 50/20; H01M 50/502; H01M 50/531; H01M 50/209; H01M 50/543; Y02E 60/10

USPC .......................................................... 429/121
See application file for complete search history.

(56) References Cited

U.S. PATENT DOCUMENTS

| | | | | |
|---|---|---|---|---|
| 2003/0054240 A1* | 3/2003 | Aronsson | ............ | H01M 50/529 |
| | | | | 429/157 |
| 2009/0305116 A1* | 12/2009 | Yang | .................... | H01M 50/224 |
| | | | | 429/61 |
| 2010/0266880 A1* | 10/2010 | Hirakawa | ........... | H01M 50/213 |
| | | | | 429/53 |

(Continued)

FOREIGN PATENT DOCUMENTS

| | | |
|---|---|---|
| JP | 5482828 | 5/2014 |
| KR | 20100081942 A † | 7/2010 |

(Continued)

*Primary Examiner* — Christian Roldan
(74) *Attorney, Agent, or Firm* — IP & T Group LLP

(57) ABSTRACT

The present invention provides a battery module which includes: a battery stack formed by stacking a plurality of battery cells on each other, each of which includes electrode tabs; a first case unit including a bottom section which surrounds one side of the battery stack and a pair of first sidewalls located on both sides of the battery stack in a direction in which battery cells are stacked; and a second case unit including a top section which surrounds the other side of the battery stack and a pair of second sidewalls located on both sides of the battery stack in the direction in which battery cells are stacked, wherein the first sidewall and the second sidewall are located on both sides of the battery stack in the direction in which battery cells are stacked, in a state in which at least portions thereof are overlapped with each other.

9 Claims, 7 Drawing Sheets

(56) References Cited

U.S. PATENT DOCUMENTS

| | | | | |
|---|---|---|---|---|
| 2013/0045403 A1* | 2/2013 | Shin | .................... | H01M 50/502 |
| | | | | 429/90 |
| 2014/0106196 A1* | 4/2014 | Ahn | ...................... | H01M 50/20 |
| | | | | 429/100 |
| 2016/0226044 A1* | 8/2016 | Ikeda | .................... | H01M 50/20 |
| 2018/0219265 A1* | 8/2018 | Osio | .................... | H01M 50/20 |

FOREIGN PATENT DOCUMENTS

| | | | |
|---|---|---|---|
| KR | 10-1029838 | | 4/2011 |
| KR | 10-1297176 | | 8/2013 |
| KR | 1586641 | † | 1/2016 |
| KR | 10-1841801 | | 5/2018 |

\* cited by examiner
† cited by third party

BATTERY MODULE

CROSS-REFERENCE TO RELATED APPLICATION

This application claims priority to Korean Patent Applications No. 10-2018-0135949 filed on Nov. 7, 2018 in the Korean Intellectual Property Office (KIPO), the entire disclosure of which is incorporated by reference herein.

BACKGROUND OF THE INVENTION

1. Field of the Invention

One embodiment of the present invention relates to a battery module.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device, or is used for a high output hybrid automobile by connecting a plurality of lithium secondary batteries in series with each other. Since the lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has been rapidly increased.

As described above, when the plurality of secondary batteries are connected with each other in series to be used in a high-output hybrid vehicle or an electric vehicle, the plurality of secondary batteries are fixed using a member such as a cover or a case, then the plurality of secondary batteries are electrically connected with each other using a connection member such as a bus bar. Therefore, the plurality of secondary batteries may be used as one battery module form.

In this case, maximizing space utilization to improve the energy density with respect to a volume of the battery module was a primary concern in the development of the battery module. In a case of the prior art, a method of stacking and storing a plurality of secondary batteries in a longitudinal direction in a module housing has been mainly used. However, in this case, a plurality of exterior case members are required to form the module housing, and a welding process is mainly used to connect the plurality of case members to each other.

In this regard, in the case of the conventional battery module, manufacturing costs and a burden on the welding quality control in the process between the manufacturing processes such as the above-described welding should be increased, and a deviation in a quality level between battery module products should occur depending on an adhesion state such as welding.

Korean Patent Publication No. 10-1029838 (registered on Apr. 15, 2011) discloses a middle and large-sized battery pack having improved cooling efficiency, which includes a plurality of battery modules in which a plurality of battery cells are connected to each other in series, however, it did not solve the above problems.

SUMMARY OF THE INVENTION

It is an object of embodiments of the present invention to provide a battery module which may more reduce manufacturing costs and a burden on quality control between coupling processes of an exterior case by minimizing the number of parts thereof than a conventional six-side exterior case that requires a large number of coupling processes such as welding.

In addition, another object of embodiments of the present invention is to provide a battery module which may prevent an occurrence of quality failures in the process, such as welding failures that occurred in a welding process for coupling a conventional exterior case, by employing a non-welding mechanical fastening structure.

Further, another object of embodiments of the present invention is to provide a battery module which may improve waterproof/dustproof performances as the number of parts of an exterior case is reduced and a gasket is disposed therein.

Further, another object of embodiments of the present invention is to provide a battery module which may improve a structural rigidity through cross fastening of a plurality of fastening members.

Further, another object of embodiments of the present invention is to provide a battery module which may effectively suppress an expansion of a battery cell due to swelling by improving a structural rigidity through a structure in which sidewalls of an exterior case are overlapped with each other in a direction in which a plurality of battery cells are stacked ('a stacking direction').

Furthermore, another object of embodiments of the present invention is to provide a battery module which may remove a buffer member that has been disposed between conventional battery cells, by employing a double sidewall structure, as well as improve internal space efficiency of an exterior case.

To achieve the above objects, according to an aspect of the present invention, there is provided a battery module including: a battery stack formed by stacking a plurality of battery cells on each other, each of which includes electrode tabs; a first case unit including a bottom section which surrounds one side of the battery stack and a pair of first sidewalls located on both sides of the battery stack in a direction in which battery cells are stacked ('a stacking direction'); and a second case unit including a top section which surrounds the other side of the battery stack and a pair of second sidewalls located on both sides of the battery stack in the direction in which battery cells are stacked, wherein the first sidewall and the second sidewall are located on both sides of the battery stack in the direction in which battery cells are stacked, in a state in which at least portions thereof are overlapped with each other.

The first case unit and the second case unit may be fastened with the battery stack interposed therebetween to form a housing unit in which the battery stack is housed.

Each of the pair of first sidewalls may extend perpendicular to the bottom section from edges of the bottom section in the stacking direction, the first sidewalls may be located inside at a predetermined distance from the edges of the bottom section in the stacking direction, and seat parts protruding to an outside of the first sidewall may be formed at the edges of the bottom section in the stacking direction.

Each of the pair of second sidewalls may extend perpendicular to the top section from edges of the top section in the stacking direction, and the edges of the second sidewalls in an extending direction may be seated on the seat parts.

Any one of the first sidewall and the second sidewall may surround outer surfaces of the battery stack in the stacking direction of the battery cells with being into surface contact.

Each of the first sidewall and the second sidewall may be formed with an area corresponding to a plane area perpendicular to the stacking direction of the battery cells.

The first case unit and the second case unit may be coupled with each other by non-welding mechanical fastening.

Each of the first case unit and the second case unit may include first front and rear sections and second front and rear sections, which surround at least a portion of both sides of the battery stack in a direction in which electrode tabs are drawn out, a first pair of fastening holes for coupling the first case unit and the second case unit with each other may be formed in a structure into which first fastening members are inserted in the direction in which the electrode tabs of the battery stack are drawn out.

A second pair of fastening holes for coupling the first case unit and the second case unit with each other may be formed in a structure into which second fastening members are inserted in the stacking direction of the battery stack.

The battery module may further include a gasket disposed between the battery stack and the top section along edges of the top section.

The battery module may further include: a bus bar assembly which includes: at least one bus bar which electrically connects the plurality of electrode tabs with each other; and a bus bar support which fix and support the at least one bus bar.

At least one insertion guide may be formed on any one of the bus bar assembly and the bottom section, which protrudes to the remaining one thereof, and at least one guide groove may be formed in the remaining one thereof, into which the at least one insertion guide is inserted.

According to another aspect of the present invention, there is provided a battery module including: a battery stack formed by stacking a plurality of battery cells on each other, each of which includes electrode tabs; a first case unit which surrounds a portion of outer surfaces of the battery stack; and a second case unit which surrounds the remaining portion of the outer surfaces of the battery stack, wherein, as the first case unit and the second case unit are coupled to each other, a double sidewall structure is formed on both sides of the battery stack in a direction in which battery cells are stacked.

According to the embodiments of the present invention, it is possible to more reduce manufacturing costs and a burden on quality control between coupling processes of the exterior case by minimizing the number of parts thereof than the conventional six-side exterior case that requires a large number of coupling processes such as welding.

In addition, according to the embodiments of the present invention, it is possible to prevent an occurrence of quality failures in the process, such as welding failures that occurred in a welding process for coupling a conventional exterior case, by employing the non-welding mechanical fastening structure.

Further, according to the embodiments of the present invention, as the number of parts of the exterior case is reduced and the gasket is disposed therein, waterproof/dustproof performances may be improved.

Further, according to the embodiments of the present invention, it is possible to improve a structural rigidity through cross fastening of the plurality of fastening members. Further, according to the embodiments of the present invention, it is possible to effectively suppress an expansion of the battery cell due to swelling by improving a structural rigidity through the structure in which sidewalls of the exterior case are overlapped with each other in the stacking direction of the plurality of battery cells.

Furthermore, according to the embodiments of the present invention, it is possible to remove a buffer member that has been disposed between conventional battery cells, by employing the double sidewall structure, as well as improve internal space efficiency of the exterior case.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
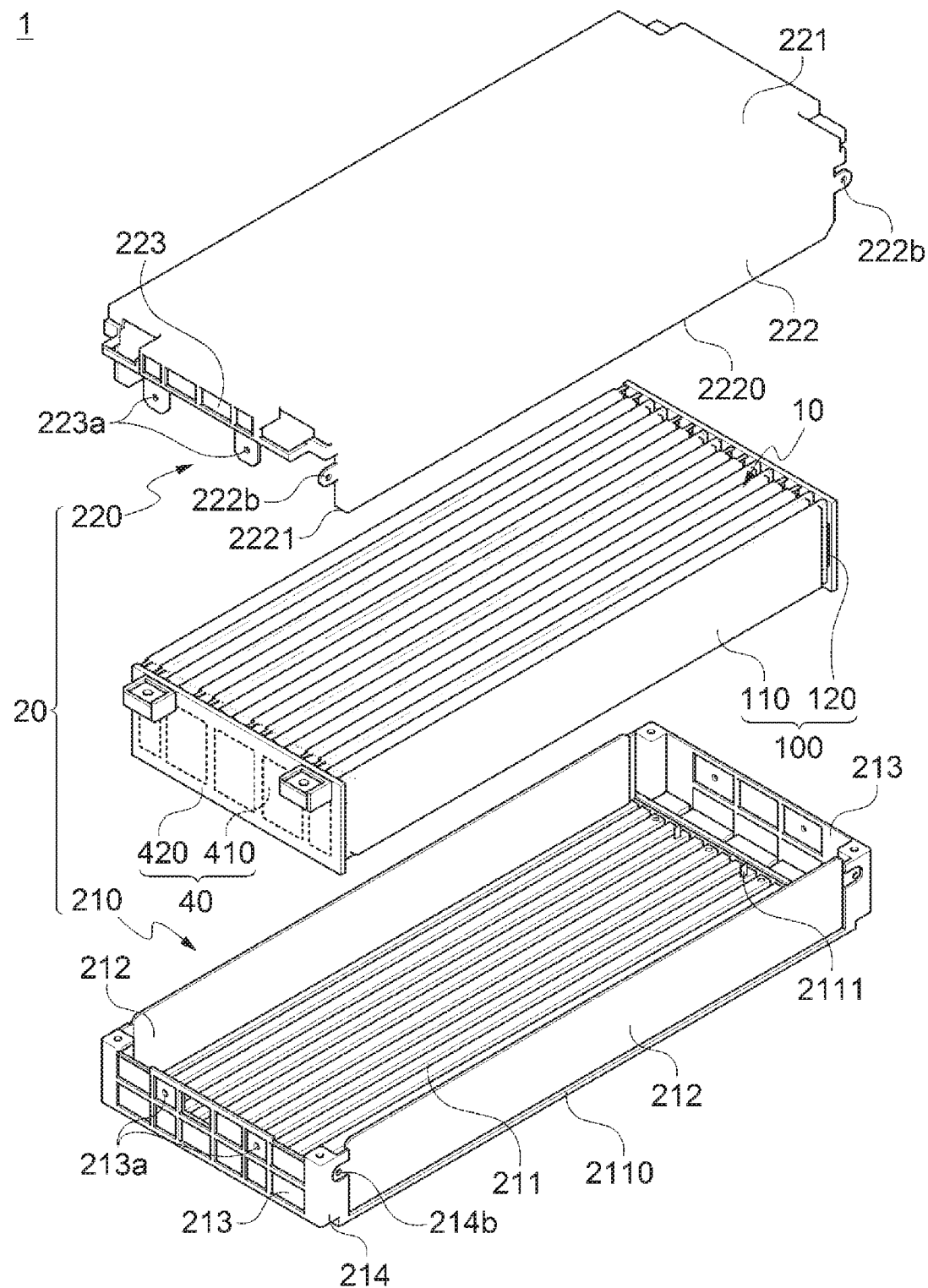
FIG. 1 is an exploded perspective view of a battery module according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail.

Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

Figure 2:
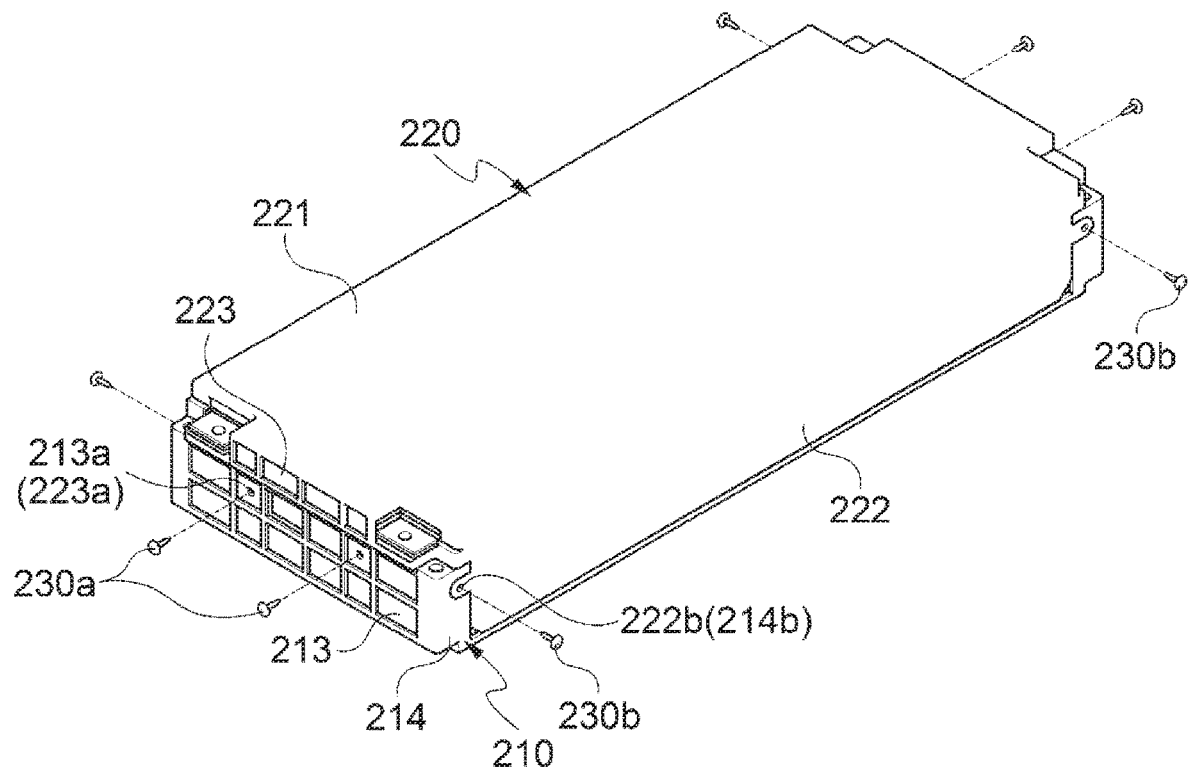
FIG. 2 is a perspective view illustrating a state in which a first case unit and a second case unit of the battery module are fastened to each other according to the embodiment of the present invention.
Figure 3:
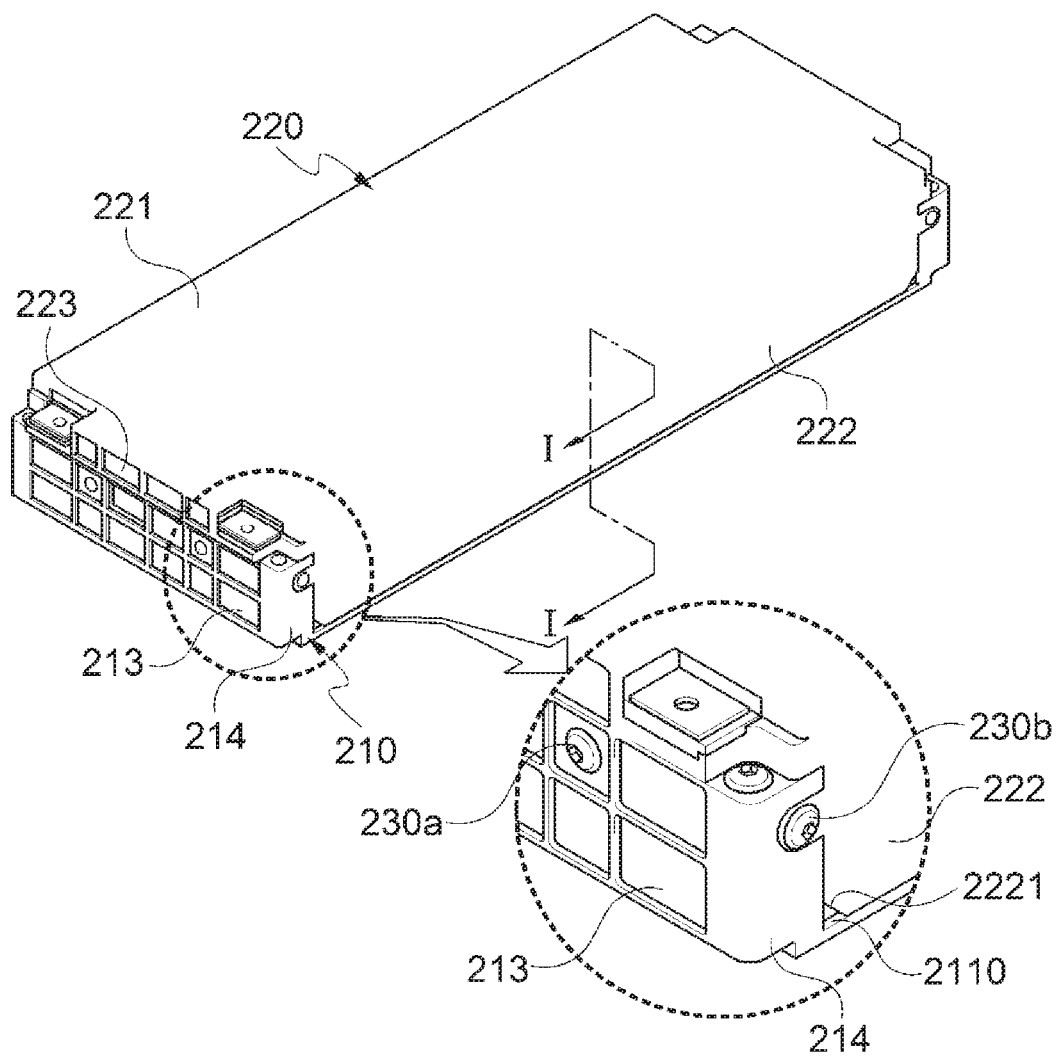
FIG. 3 is a perspective view and a partially enlarged view illustrating the battery module according to the embodiment of the present invention.

FIG. 1 is an exploded perspective view of a battery module 1 according to an embodiment of the present invention, FIG. 2 is a perspective view illustrating a state in which a first case unit 210 and a second case unit 220 of the battery module 1 are fastened to each other according to the embodiment of the present invention, and FIG. 3 is a perspective view and a partially enlarged view illustrating the battery module 1 according to the embodiment of the present invention.

Referring to FIGS. 1 to 3, the battery module 1 according to the embodiment of the present invention includes: a battery stack 10 formed by stacking a plurality of battery cells 100 on each other, each of which includes electrode tabs 120; the first case unit 210 which surround at least a portion of outer surfaces of the battery stack 10; and the second case unit 220 provided so as to be fastened to the first case unit 210 to surround the remaining outer surfaces of the battery stack 10.

In this case, the above-described first case unit 210 may include a bottom section 211 which surrounds one side (a lower side in the drawings) of the battery stack 10, and a pair of first sidewalls 212 located on both sides of the battery stack 10 in a direction in which battery cells 100 are stacked, and the second case unit 220 may include a top section 221 which surrounds the other side (an upper side in the drawings) of the battery stack 10, and a pair of second sidewalls 222 located on both sides of the battery stack 10 in the stacking direction of the battery cells 100. The above-described first sidewall 212 and second sidewall 222 may be located, in a state in which at least portions thereof are overlapped with each other, and the first sidewalls 212 and the second sidewalls 222 may surround both sides of the above-described battery stack 10 in the stacking direction with being overlapped with each other.

Specifically, each of the above-described pair of first sidewalls 212 may extend perpendicular to the bottom section 211 from edges of the bottom section 211 in the stacking direction, and preferably, is formed at a position spaced inwardly from the edges of the bottom section 211 in the stacking direction. Therefore, when viewed from a direction in which the electrode tabs 120 are drawn out, seat parts 2110 protruding to an outside of the first sidewall 212 may be formed at the edges of the bottom section 211 in the stacking direction, and the seat parts 2110 may be formed while protruding by the predetermined distance as described above.

In addition, each of the above-described pair of second sidewalls 222 may extend perpendicular to the top section 221 from edges of the top section 221 in the stacking direction, and preferably, is bent downward from the edges of the top section 221 in the stacking direction so as to surround the first sidewall 212. In this case, the second sidewall 222 may extend to the above-described seat parts 2110 of the first case unit 210, and edges 2220 of the second sidewalls 222 in an extending direction (a downward bending direction perpendicular to the top section 221) of the second sidewalls 222 may be seated on and supported by the seat parts 2110.

Meanwhile, the battery cell 100 of the battery module 1 according to the embodiment of the present invention may include a cell body 110 which is an electrode assembly (not illustrated) enclosed by an outer case (not illustrated), and the electrode tabs 120 drawn out from the cell body 110. In this case, the remaining portions of the battery cell 100 except for the electrode tabs 120 may be considered as the cell body 110.

Furthermore, each of the above-described first sidewall 212 and the second sidewall 222 may be formed with an area corresponding to a plane area perpendicular to the stacking direction of the battery cells 100. Therefore, the first sidewall 212 and the second sidewall 222 overlapped with each other may be located so as to surround an entire outer surface of the battery stack 10 in the stacking direction. Preferably, each of the above-described first sidewall 212 and the second sidewall 222 may be formed with the area corresponding to the plane area perpendicular to the stacking direction of the cell bodies 110, and the first sidewall 212 and the second sidewall overlapped with each other may be located so as to surround the outermost side of the plurality of stacked cell bodies 110 in the stacking direction while forming a double sidewall structure.

Meanwhile, the configuration, in which the above-described battery module 1 according to the embodiment of the present invention is formed so that the first sidewalls 212 surround both sides of the battery stack 10 in the stacking direction, and the second sidewalls 222 surround outer sides of the first sidewalls 212 from the outside of the first sidewall 212, has been described, but this configuration is only an example and it is not limited thereto. For example, the first sidewalls 212 are formed outside the second sidewalls 222 so that the second sidewalls 222 surround both sides of the battery stack 10 in the stacking direction.

Furthermore, the above-described first case unit 210 may include a pair of first front and rear sections 213 which surround at least a portion of both sides of the battery stack 10 in the direction in which the electrode tabs 120 are drawn out, and the second case unit 220 may include a pair of second front and rear sections 223 which surround at least a portion of both sides of the battery stack 10 in the direction in which the electrode tabs 120 are drawn out. In this case, the above-described pair of first front and rear sections 213 may extend by bending upward from edges of the bottom section 211 in the direction in which the electrode tabs 120 are drawn out, and the pair of second front and rear sections 223 may extend by bending downward from edges of the top section 221 in the direction in which the electrode tabs 120 are drawn out.

Preferably, the above-described pair of first front and rear sections 213 may be formed so as to surround a portion of both sides of the battery stack 10 in the direction in which the electrode tabs 120 are drawn out, and the pair of second front and rear sections 223 may be formed so as to surround the remaining portions of both sides of the battery stack 10 in the direction in which the electrode tabs 120 are drawn out. Therefore, both of the first front and rear sections 213 and the second front and rear sections 223 may surround the entire surface on both sides of the battery stack 10 in the direction in which the electrode tabs 120 are drawn out by fastening the first case unit 210 and the second case unit 220 to each other.

That is, the first case unit 210 and the second case unit 220 may be fastened to each other with the battery stack 10 interposed therebetween, and entire six outer surfaces of the battery stack 10 may be surrounded by fastening the first case unit 210 and the second case unit 220 to each other. Therefore, a housing unit 20 capable of housing the battery stack 10 may be formed through the fastening of the first case unit 210 and the second case unit 220.

In addition, the battery module 1 according to the embodiment of the present invention may further include a bus bar assembly 40 disposed between the first front and rear sections 213 and the battery stack 10. In this case, the bus bar assembly 40 may include at least one bus bar 410 for electrically connecting the plurality of electrode tabs 120 with each other and a bus bar support 420 for fixing and supporting the at least one bus bar 410.

Specifically, each of the above-described one or more bus bars 410 may be formed in a plate shape to electrically connect the plurality of electrode tabs 120 with each other through contacting and welding with the electrode tabs 120. In addition, the above-described bus bar support 420 may include a frame structure so as to fix one or more bus bars 410 to each other with being spaced apart from each other, and may be formed so as to surround the entire outer surface of the one or more bus bars 410 so that the one or more bus bars 410 are not exposed to the outside. The above-described bus bar support 420 may be formed of an insulation material such as plastic, thereby blocking the possibility of electrical communication between the one or more bus bars 410 and between the bus bar 410 and an external object.

Meanwhile, the above-described battery cell 100 may be formed as a bidirectional battery cell 100 in which the electrode tabs 120 are drawn out to both sides of the cell body 110. Thereby, the bus bar assembly 40 for electrical connection between the plurality of battery cells 100 may be disposed on both sides of the battery stack 10 in the direction in which the electrode tabs 120 are drawn out, thus to be connected to each of the electrode tabs 120 on both sides.

Meanwhile, the above-described first case unit 210 may further include sidewall support parts 214 which extend perpendicular to each of the first front and rear sections 213 and the bottom section 211 from both ends of first front and rear sections 213 in the stacking direction of the battery cells 100, thus to connect the first front and rear sections 213 and the first sidewall 212. In this case, the sidewall support part 214 extends from the end of the first front and rear sections 213 and the end of the bottom section 211 in the above-described stacking direction of the battery cells 100, respectively, thus to be located outside from the first sidewall 212 as viewed from the direction in which the electrode tabs 120 are drawn out.

Furthermore, the above-described sidewall support parts 214 are located at both ends of the first sidewall 212 on both sides of the battery cell 100 in the direction in which the electrode tabs 120 are drawn out. Therefore, the second sidewall 222 of the second case unit 220 is inserted between the above-described sidewall support parts 214 on both sides, thus to be seated on the seat part 2110.

In this case, chamfered faces 2221 may be formed in an inclined manner with respect to the bottom section 211 at both ends (corners) of an edge 2220 in the extending direction of the above-described second sidewall 222 in the direction in which the electrode tabs 120 of the battery cell 100 are drawn out. Through the chamfered faces 2221, an interference between the second sidewall 222 and the sidewall support parts 214 on both sides may be minimized during an assembly process of the first case unit 210 and the second case unit 220, such that the second case unit 220 may be more easily inserted into the sidewall support parts 214 and seated on the seat part 2110.

Meanwhile, the above-described first case unit 210 and the second case unit 220 may be coupled with each other by non-welding mechanical fastening.

Specifically, a first pair of fastening holes 213a and 223a for coupling the first case unit 210 and the second case unit 220 with each other may be formed in a structure into which first fastening members 230a can be inserted in the direction in which the electrode tabs 120 of the battery stack 10 are drawn out, and a second pair of fastening holes 214b and 222b for coupling the first case unit 210 and the second case unit 220 with each other may be formed in a structure into which second fastening members 230b can be inserted in the stacking direction of the battery stack 10.

Preferably, at least one first fastening hole 213a may be formed in the first front and rear section 213 of the above-described first case unit 210, and at least one second fastening hole 223a may be formed in at least one protrusion portion at an edge of the second front and rear section 223 of the second case unit 220 on the first front and rear section 213 side, which is formed at a position corresponding to the first fastening hole 213a by protruding from the edge of the second front and rear section 223 to the first front and rear section 213 side.

In this case, the first fastening hole 213a and the second fastening hole 223a may be coaxially disposed with being overlapped with each other as the first case unit 210 and the second case unit 220 are assembled, thus to form the first pair of fastening holes 213a and 223a, then the first fastening members 230a are inserted into the coaxial first pair of fastening holes 213a and 223a in the direction in which the electrode tabs 120 are drawn out, such that the first case unit 210 and the second case unit 220 may be bound with each other by non-welding mechanical fastening.

In addition, at least one third fastening hole 214b may be formed in the sidewall support part 214. of the first case unit 210, and at least one fourth fastening hole 222b may be formed in at least one protrusion portion at the end of the second side wall 222 of the second case unit 220 in the above-described direction in which the electrode tabs 120 are drawn out, which is formed at a position corresponding to the third fastening hole 214b by protruding from the end of the second sidewall 222 to the sidewall support part 214.

In this case, the third fastening hole 214b and the fourth fastening hole 222b may be coaxially disposed with being overlapped with each other as the first case unit 210 and the second case unit 220 are assembled, thus to form the second pair of fastening holes 214b and 222b, then the second fastening members 230b are inserted into the coaxial second pair of fastening holes 214b and 222b in the stacking direction of the battery cells 100, such that the first case unit 210 and the second case unit 220 may be bound with each other by non-welding mechanical fastening.

That is, as the battery module 1 according to the embodiment of the present invention is coupled, the first case unit 210 and the second case unit 220, which can cover six surfaces of the battery stack 10, may be bound with each other by the first fastening member 230a and the second fastening member 230b. In particular, each of the first fastening member 230a and the second fastening member 230b may be inserted into the fastening holes at right angles in the stacking direction of the battery cells 100 and in the direction in which the electrode tabs 120 of the battery cells 100 are drawn out perpendicular to stacking direction, respectively.

Therefore, the structural rigidity of the housing unit 20 may be improved, and furthermore, the above-described first fastening member 230a and the second fastening member 230b are disposed at right angles to each other, such that even when an external impact is applied thereto, regardless of the direction of the applied impact, the fastening state of any one of the first fastening member 230a and the second fastening member 230b can be maintained, and thereby increasing durability.

In addition, even when the battery cell 100 is expanded during using the battery module 1 according to the embodiment of the present invention, the first case unit 210 and the second case unit 220 are bound with each other by the first fastening member 230*a* which are inserted perpendicular to the direction in which the battery cell 100 is expanded, such that a deformation of the housing unit 20 in stacking direction of the battery cells 100 may be suppressed.

Meanwhile, in the drawings, the first fastening member 230*a* and the second fastening member 230*b* are illustrated as a bolt for fastening, but it is not limited thereto, and any fastening means such as a rivet may be sufficiently used so long as it can be inserted into the first pair of fastening holes 213*a* and 223*a* and the second pair of fastening holes 214*b* and 222*b* to bind the first case unit 210 and the second case unit 220 with each other.

As described above, in the battery module 1 according to the embodiment of the present invention, it is possible to more reduce manufacturing costs and a burden on quality control between coupling processes of the exterior case by decreasing the number of components of the housing unit 20 for surrounding six outer surfaces of the battery stack 10 than the conventional six-side exterior case that requires a large number of coupling processes such as welding.

Furthermore, in the battery module 1 according to the embodiment of the present invention, the first case unit 210 and the second case unit 220 may be coupled to each other through the non-welding mechanical fastening structure, such that it is possible to prevent an occurrence of quality failures in the process, such as welding failures that occurred in a welding process for coupling the conventional exterior case.

Figure 4:
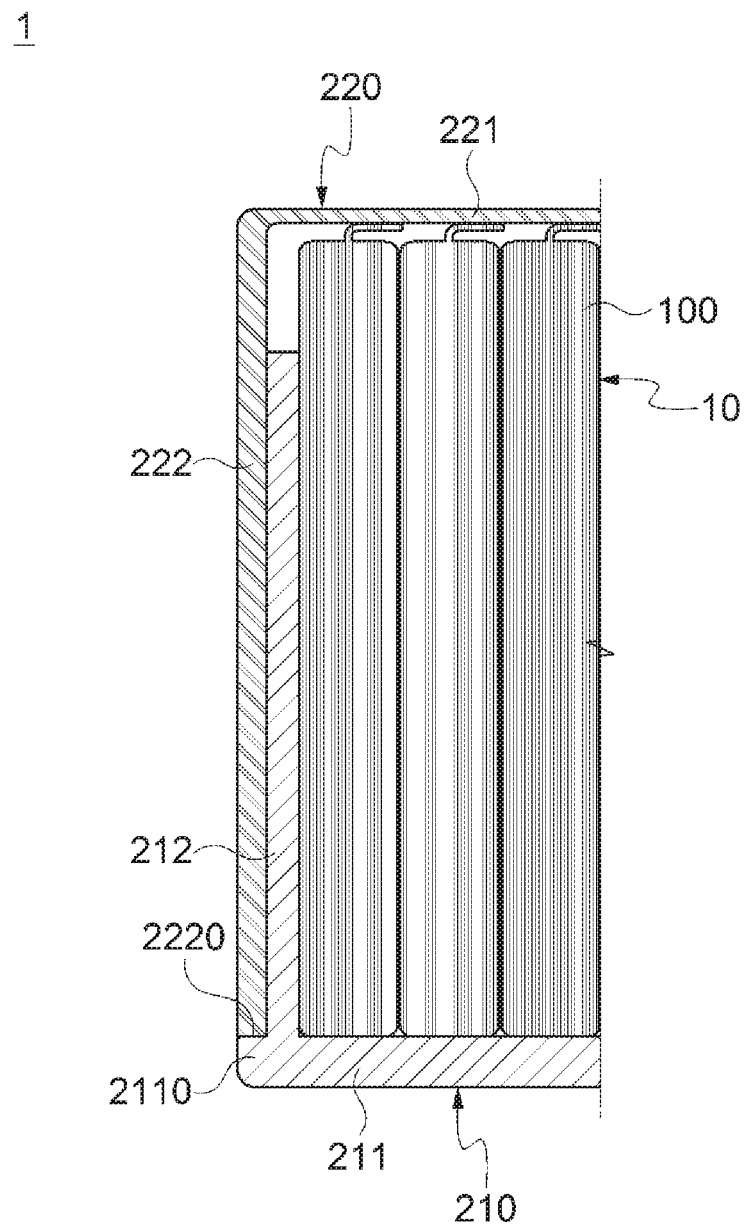
FIG. 4 is a cross-sectional view taken on line I-I of the battery module according to the embodiment of the present invention shown in FIG. 3.

FIG. 4 is a cross-sectional view taken on line I-I of the battery module 1 according to the embodiment of the present invention shown in FIG. 3.

Referring to FIG. 4, as described above, it is possible to form the double sidewall structure, in which the first sidewall 212 and the second sidewall 222 are in surface contact with being overlapped with each other, through the assembly and mechanical fastening between the first case unit 210 and the second case unit 220, and the overlapped first sidewall 212 and the second sidewall 222 may be disposed on both sides of the battery stack 10 in the stacking direction.

Meanwhile, in the case of the battery module 1 according to the embodiment of the present invention, the double overlapping structure of the first sidewall 212 and the second sidewall 222 surrounds the outer sides of the battery stack 10 in the stacking direction, such that the structural rigidity of the housing unit 20 in the stacking direction of the battery cells 100 may be improved. Therefore, even when the battery cell 100 is expanded during using the battery module 1 according to the embodiment of the present invention, it is possible to suppress an expansion of the battery cell 10 due to swelling through the double sidewall structure.

As described above, the battery module 1 according to the embodiment of the present invention has the improved structural rigidity of the housing unit 20 in the stacking direction of the battery cells 100, such that the buffer members, which are disposed between a plurality of battery cells 100 for buffering an expansion in the conventional battery cells 100, may be excluded. As a result, internal space efficiency of the housing unit 20 may be improved by the volume of the buffer members, and thereby increasing the energy density of the battery module 1.

Figure 5:
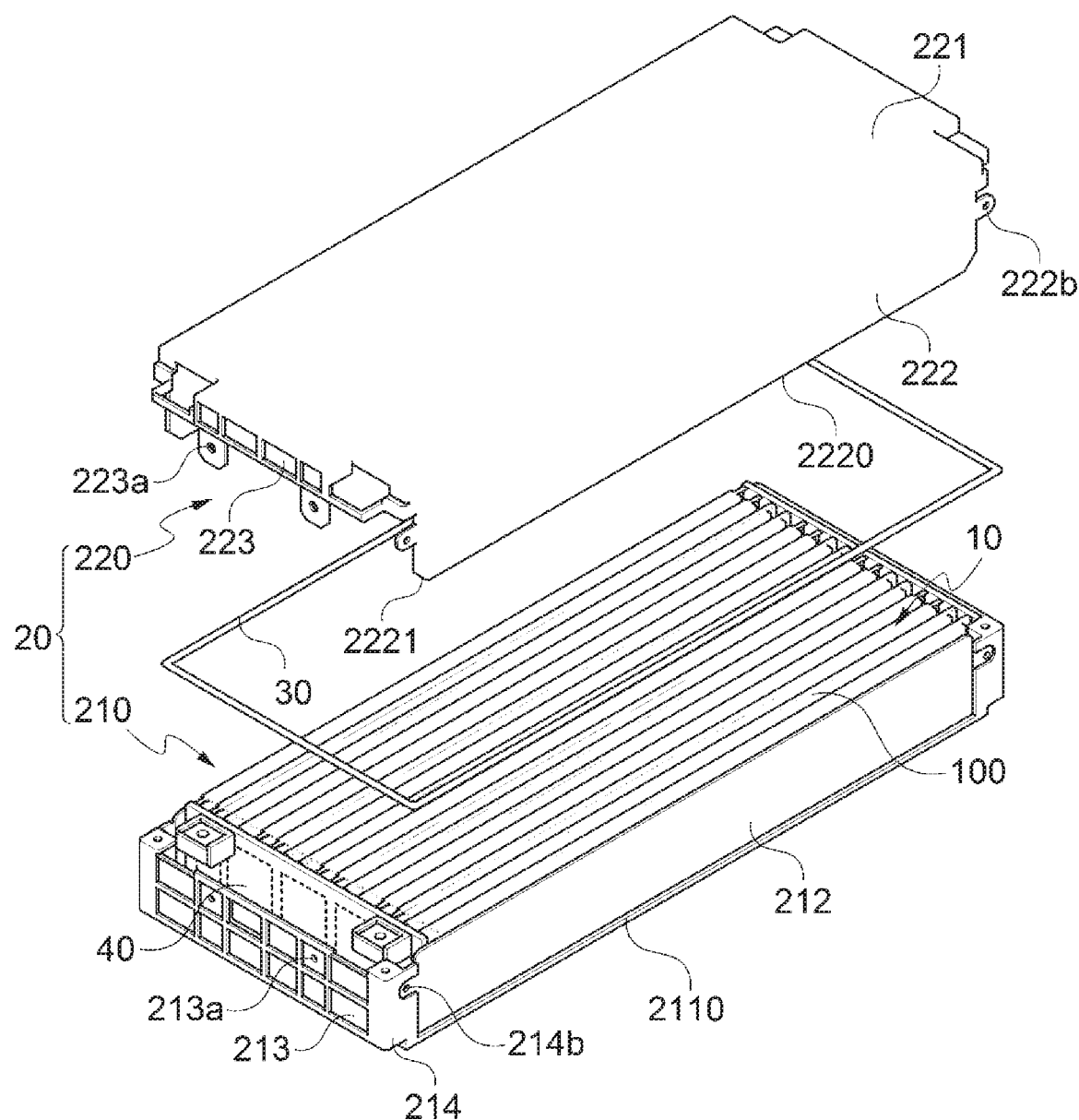
FIG. 5 is an exploded perspective view illustrating a state in which a gasket is mounted in the battery module according to the embodiment of the present invention.

FIG. 5 is an exploded perspective view illustrating a state in which a gasket 30 is mounted in the battery module 1 according to the embodiment of the present invention.

Referring to FIG. 5, the battery module 1 according to the embodiment of the present invention may further include the gasket 30 disposed between the battery stack 10 and the top section 221 of the second case unit 220 along the edges of the top section 221.

Specifically, the above-described gasket 30 may be formed in a rectangular ring shape and serves to minimize an empty space between the battery stack 10 and the top section 221 along the edges of the top section 221 inside the second sidewall 222 to obtain an increased sealing effect.

As described above, in the battery module 1 according to the embodiment of the present invention, the number of parts of the housing unit 20 is reduced and the gasket 30 is disposed therein, such that waterproof and dustproof performances may be improved.

Figure 6:
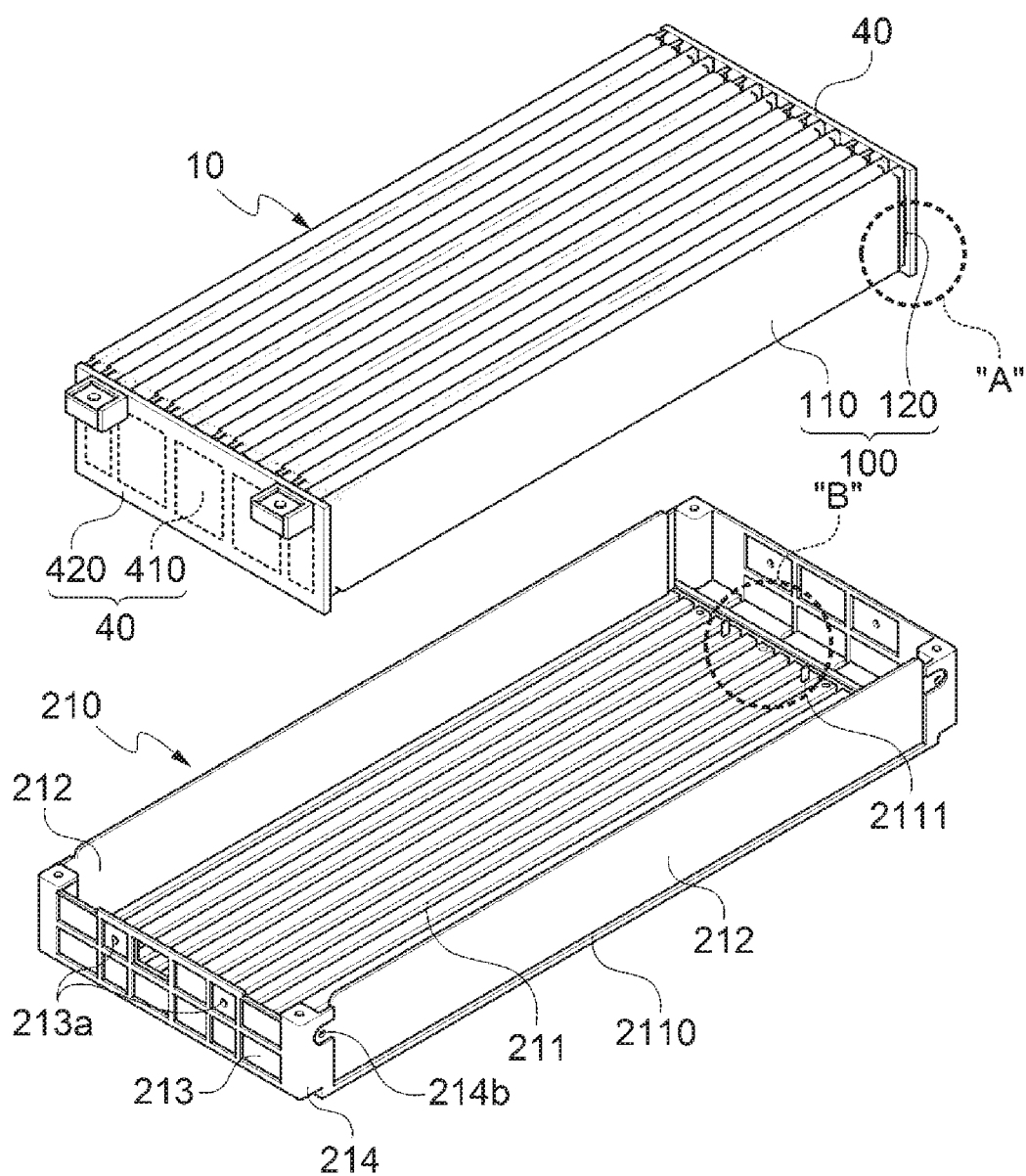
FIG. 6 is an exploded perspective view illustrating a state in which a battery stack is placed on the first case unit of the battery module according to the embodiment of the present invention.
Figure 7A:
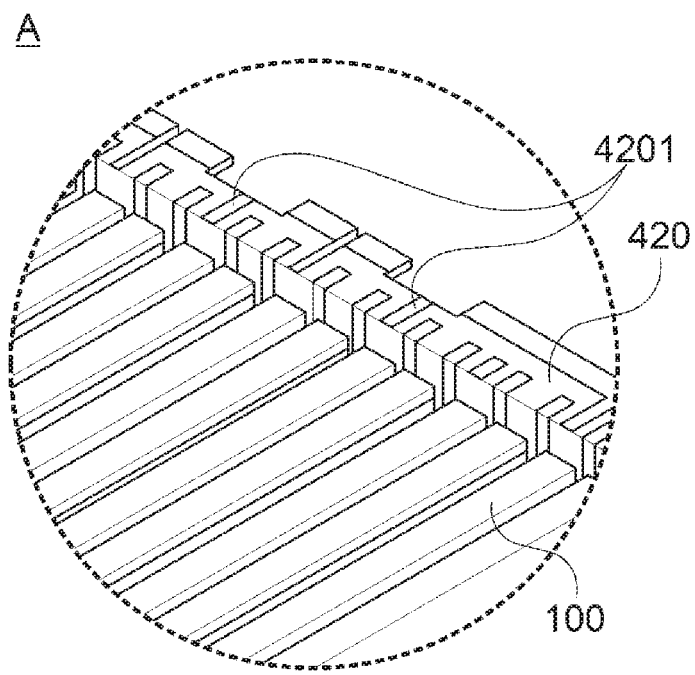
FIG. 7A is a partially enlarged view of a portion A in FIG. 6 as viewed from the bottom.
Figure 7B:
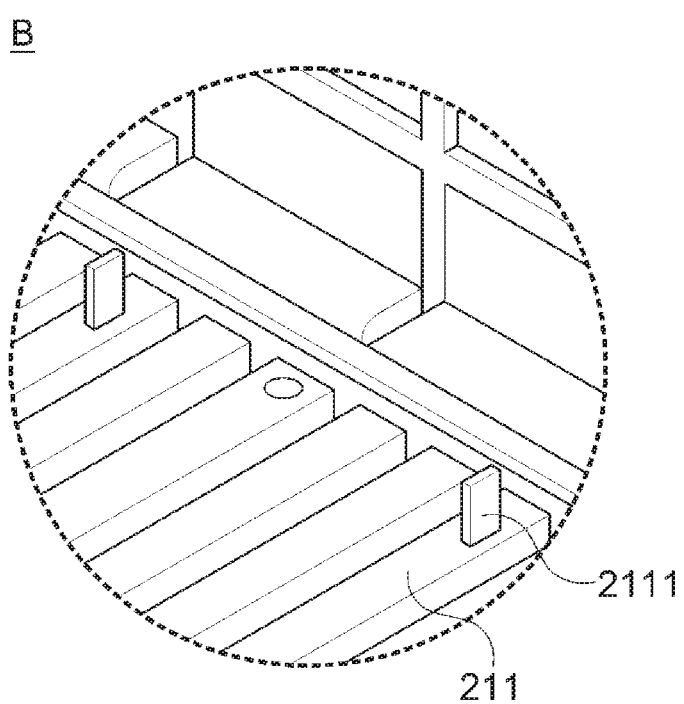
FIG. 7B is a partially enlarged view of a portion B in FIG. 6 as viewed from the top.

FIG. 6 is an exploded perspective view illustrating a state in which the battery stack 10 is placed on the first case unit 210 of the battery module 1 according to the embodiment of the present invention, FIG. 7A is a partially enlarged view of a portion A in FIG. 6 as viewed from the bottom, and FIG. 7B is a partially enlarged view of a portion B in FIG. 6 as viewed from the top. More specifically, for the convenience of description, the above-described FIG. 7A is a partially enlarged view illustrating a state in which the battery stack 10 and the bus bar assembly 40 of the portion A in FIG. 6A are seen from the bottom section 211 side (lower side in the drawings).

Referring to FIGS. 6 and 7, at least one insertion guide 2111 protruding to the bus bar assembly 40 side with a predetermined height may be formed at a position of bottom section 211 of the first case unit 210, on which the bus bar assembly 40 is placed, and at least one guide groove 4201, into which the at least one insertion guide 2111 can be inserted, may be formed in at least a portion of the bus bar assembly 40 on the bottom section 211 side by pressing in a predetermined depth inward.

Preferably, the above-described at least one guide groove 4201 may be formed in the bus bar support 420 of the bus bar assembly 40, wherein each of one or more insertion guides 2111 and each of one or more guide grooves 4201 may be formed at positions corresponding to each other.

Therefore, when the battery stack 10 and the bus bar assembly 40 are placed on the first case unit 210 with being fastened to each other, the at least one insertion guide 2111 may be inserted into the at least one guide groove 4201, thereby guiding the battery stack 10 and the bus bar assembly 40 to be placed on the first case unit 210 in position, and the placing state of the battery stack 10 may be supported.

Meanwhile, in the case of the battery module 1 according to the embodiment of the present invention, the configuration, in which at least one guide groove 4201 is formed in the lower side of the bus bar assembly 40 in the drawings, and at least one insertion guide 2111 is formed on the upper side of the bottom section 211, has been described, but it is not limited thereto. For example, at least one insertion guide 2111 may protrude on the lower side of the bus bar assembly 40, and at least one guide groove 4201 may be formed by pressing in the bottom section 211 at a position corresponding thereto.

Although the representative embodiments of the present invention have been described in detail, it will be understood by persons who have a common knowledge in the technical field to which the present invention pertains that various modifications and variations may be made therein without departing from the scope of the present invention.

Accordingly, the scope of the present invention should not be limited to the embodiments, but be defined by the appended claims as well as equivalents thereof.

DESCRIPTION OF REFERENCE NUMERALS

1: Battery module
10: Battery stack
100: Battery cell
110: Cell body
120: Electrode tab
20: Housing unit
210: First case unit
211: Bottom section
2110: Seat part
2111: Insertion guide
212: First sidewall
213: First front and rear sections
213a: First fastening hole
214: Sidewall support part
214b: Third fastening hole
220: Second case unit
221: Top section
222: Second sidewall
222b: Fourth fastening hole
223: Second front and rear sections
223a: Second fastening hole
2220: Edge in extending direction
2221: Chamfered face
230a: First fastening member
230b: Second fastening member
30: Gasket
40: Bus bar assembly
410: Bus bar
420: Bus bar support
4201: Guide groove

What is claimed is:

1. A battery module comprising:
a battery stack formed by stacking a plurality of battery cells, the plurality of battery cells including a plurality of electrode tabs;
a first case unit comprising a bottom section configured to cover one side of the battery stack and a pair of first sidewalls configured to cover a portion of both sides of the battery stack in a direction in which the battery cells are stacked;
a second case unit comprising a top section configured to cover another side of the battery stack and a pair of second sidewalls configured to cover another portion of the both sides of the battery stack and the pair of first sidewalls;
a bus bar assembly comprising at least one bus bar electrically coupling the plurality of electrode tabs and a bus bar support configured to fix and support the at least one bus bar; and
a front and rear section coupled with the first case unit and the second case unit, respectively, and configured to cover the bus bar assembly;
wherein the pair of first sidewalls and the pair of second sidewalls overlap with each other to form a double-wall structure in the direction in which the battery cells are stacked, and
wherein at least one guide groove is formed in the bus bar support, and at least one insertion guide is formed at the bottom section of the first case unit with a predetermined height and inserted into the at least one guide groove.

2. The battery module according to claim 1, wherein the first case unit and the second case unit are fastened with the battery stack interposed therebetween to form a housing unit in which the battery stack is housed.

3. The battery module according to claim 1, wherein the pair of first sidewalls respectively extend perpendicular to the bottom section from edges of the bottom section in the direction in which the battery cells are stacked,
the pair of first sidewalls are located inside at a predetermined distance from the edges of the bottom section in the direction in which the battery cells are stacked, and
seat parts protruding to an outside of the pair of first sidewalls are formed at the edges of the bottom section in the direction in which the battery cells are stacked.

4. The battery module according to claim 3, wherein the pair of second sidewalls respectively extend perpendicular to the top section from edges of the top section in the direction in which the battery cells are stacked, and
the edges of the pair of second sidewalls in an extending direction are seated on the seat parts.

5. The battery module according to claim 1, wherein any one of the pair of first sidewalls and the pair of second sidewalls are in surface contact with outer surfaces of the battery stack in the direction in which the battery cells are stacked.

6. The battery module according to claim 1, wherein the first case unit and the second case unit are coupled with each other by non-welding mechanical fastening.

7. The battery module according to claim 6, wherein the first case unit and the second case unit respectively includes a pair of first front and rear sections and a pair of second front and rear sections, which cover at least a portion of both sides of the battery stack in a direction in which electrode tabs are drawn out,
a first pair of fastening holes for coupling the first case unit and the second case unit with each other are formed in a structure into which first fastening members are inserted in the direction in which the electrode tabs of the battery stack are drawn out.

8. The battery module according to claim 7, wherein a second pair of fastening holes for coupling the first case unit and the second case unit with each other are formed in a structure into which second fastening members are inserted in the direction in which the battery cells are stacked.

9. The battery module according to claim 1, further comprising a gasket disposed between the battery stack and the top section along edges of the top section.

* * * * *